United States Patent Office 3,496,971
Patented Feb. 24, 1970

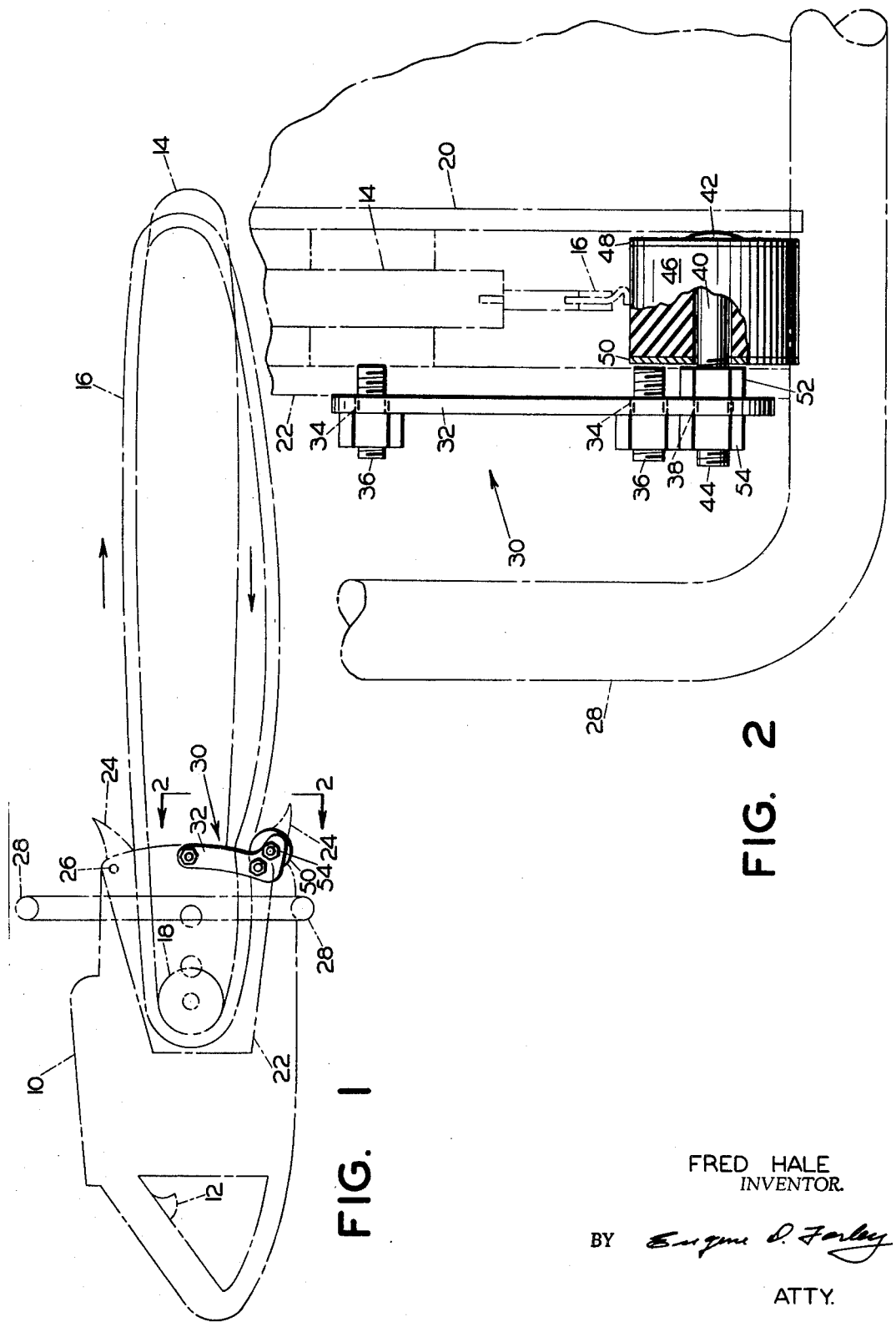

3,496,971
CHAIN SAW HANDLE GUARD
Fred Hale, 920 Madison St., Baker, Oreg. 97814
Filed Feb. 28, 1968, Ser. No. 709,040
Int. Cl. B27b 17/00
U.S. Cl. 143—32    3 Claims

ABSTRACT OF THE DISCLOSURE

A chain saw handle guard comprises an arm mounting a soft roller beneath a chain saw chain in a position such that when the chain becomes dislodged and falls downwardly, it engages the roller which thereupon absorbs the abrasive shock. This in turn protects the operator and avoids damaging both the saw chain and the underlying handle.

---

This invention pertains to a guard for chain saw handles.

As is well known, a conventional chain saw comprises a motor unit which drives a continuous saw chain mounted on a forwardly extending blade. A handle, usually made of tubular aluminum or other metal, completely surrounds the motor unit at the base of the blade. The handle is grasped by the operator in the various use positions of the saw as the latter is applied to its normal felling, bucking, and limbing operations.

In the operation of the saw, it is a common occurrence for the saw chain to become dislodged from the blade. This occurs when the lower stretch of the chain becomes wedged in a knot, or binds in the kerf. The upper stretch of the chain thereupon becomes slack. As a consequence the saw chain while momentarily still being driven by the motor unit, disengages itself from the blade and drops downwardly.

When this takes place, the chain briefly engages the underlying segment of the chain saw handle and saws through it. This is a very common occurrence and results not only in hazard to the operator but also in the necessity of replacing the handle at frequent intervals with attendant expense.

In an effort to solve the problem, it is common practice among logging personnel to wrap the chain saw handle with sheet rubber, fiber glass, or like material in an effort to guard it. However, such expedients are time consuming, awkward and inefficient.

It accordingly is the object of the present invention to provide a guard which underlies the lower stretch of a saw chain and protects efficiently the underlying handle when the saw chain becomes dislodged from the blade.

The manner in which the foregoing and other objects of this invention are accomplished will be apparent from a consideration of the accompanying specification and claims, considered together with the drawings, wherein:

FIG. 1 is a view in side elevation of a chain saw with the saw chain thereof in its incipient dislodged or demounted condition; and FIG. 2 is a fragmentary sectional view taken along line 2—2 of FIG. 1 of the blade portion of the saw illustrating the manner of attachment and operation of the herein described guard.

In its broad aspect, the chain saw handle guard of the invention comprises a roller and an arm for mounting the roller directly beneath the saw chain and above the handle. The peripheral surface of the roller is of rubber or other soft material so that when the chain becomes dislodged, it drops onto the roller, scarring and defacing its soft rubber surface but preventing damage to the handle and to the operator.

Considering the foregoing in greater detail and with particular reference to the drawings:

As is illustrated in FIG. 1, the guard of the present invention is adapted for use in conjunction with a conventional chain saw comprising basically a motor unit 10 operated by means of a trigger 12; a saw blade 14 which projects forwardly from the motor unit; and a continuous saw chain 16 which tracks on the blade.

Chain 16 is driven by a sprocket 18. Its inner end is housed between a pair of plates 20, 22. The latter mount dogs 24 which normally are secured to the plates by bolts penetrating bolt holes 26. A handle 28 completely surrounds the saw at the base of the saw blade, spaced outwardly therefrom, and lying in a plane substantially normal thereto.

The handle is fabricated from a suitable structural material such as aluminum tubing. It is adapted to be grasped by the operator who manipulates the saw in various operating positions required for the felling, bucking, and limbing operations for which the saw is employed.

The presently described guard protects the lower segment of handle 28 from being severed when saw chain 16 inadvertently becomes dislodged from blade 14. As noted hereinabove, this occurs when the working lower stretch of the chain becomes snagged on a knot or lodged in the kerf with the result that as sprocket 18 continues its forward drive, the upper stretch of the chain becomes slack and falls off the blade.

When this happens the saw chain normally will collapse against the lower segment of handle 28 and will abrade it while still being driven during the short interval of time required for the operator to recognize the situation and stop the saw. In fact, in a very short period of time the saw chain will saw completely through the handle.

To overcome this problem there is mounted on the motor unit of the saw the herein described guard attachment, indicated generally at 30.

In the illustrated form of the invention, the guard attachment is mounted on an L-shaped arm 32. The shank of the arm is provided with a pair of spaced holes 34 having a spacing corresponding to the spacing of the bolt holes on structural plate 22 which normally mount the falling dogs with which the saw may be equipped. These holes afford a convenient means of mounting the guard by means of bolts 36 without serious modification of the saw structure, although if desired the guard may be attached to other components of the motor unit.

The forwardly angled portion of arm 32 has an opening 38 in which is mounted a short shaft 40.

The shaft extends substantially at right angles to the arm and underlies both blade 14 and saw chain 16 in a location forwardly of and above the lower segment of handle 28.

The outer end of shaft 40 is riveted as indicated at 42. Its inner end is threaded as indicated at 44.

Shaft 40 mounts a roller 46 which preferably comprises a cylindrical block of rubber or other material which is soft, relative to the chain saw teeth, and abradable.

The roller is provided with a transverse bore so that it may be journaled in a freely rotatable condition about shaft 40. When thus mounted it is retained by means of a pair of washers 48, 50 and secured in spaced relation to arm 32 by means of lock nuts 52, 54 which are threaded onto the threaded end 44 of the shaft.

Accordingly as is apparent particularly from FIG. 1, when saw chain 16 becomes dislodged, its lower stretch drops downwardly upon the soft peripheral surface of roller 46. The roller thereupon takes the abrasive shock of the impact, protecting both handle 28 and the teeth of the saw chain. When the roller becomes worn, it easily may be removed and replaced by manipulating lock nuts 52, 54 as required to remove the shaft, remove the old roller therefrom, mount a new roller, and replace the shaft.

It is to be understood that the form of my invention herein shown and described is to be taken as an illustrative example of the same and that various changes in the shape, size and arrangement of parts may be resorted to without departing from the spirit of my invention or the scope of the subjoined claims.

Having thus described my invention, I claim:

1. For use with a chain saw having a drive motor unit and a forwardly projecting blade mounting a continuous saw chain in a vertical plane in the normal use position of the saw, and a handle underlying the blade, a guard for the handle comprising:
   (a) an arm,
   (b) mounting means on one end of the arm for mounting it on the chain saw motor unit adjacent the blade,
   (c) the other end of the arm extending to a plane below the plane of the lower stretch of the saw chain,
   (d) a shaft mounted on said other end of the arm substantially normal thereto, underlying and adjacent to the blade and the saw chain mounted thereon, and
   (e) roller means having a soft peripheral surface journaled on the shaft and positioned in the falling path of the saw chain when it becomes dislodged from the blade.

2. The guard of claim 1 wherein the peripheral surface of the roller means comprises rubber.

3. The guard of claim 1 wherein the roller means comprises an axially bored cylinder of rubber journaled for free rotation on the shaft, a pair of washers positioned one on each side of the cylinder, and lock nut means securing the cylinder on the shaft a spaced distance outwardly from the arm.

References Cited

UNITED STATES PATENTS 2,061,195   11/1936   Horner.
3,092,156   6/1963   Hayden.
3,380,493   4/1968   Giroux.

DONALD R. SCHRAN, Primary Examiner

U.S. Cl. X.R.
143—159